United States Patent [19]
Buechel et al.

[11] 3,916,451
[45] Nov. 4, 1975

[54] FLOATING CENTER PROSTHETIC JOINT

[76] Inventors: Frederick F. Buechel, 127 Short Hills Road, Apt. 159, West Orange, N.J. 07052; Michael J. Pappas, 209 Park Place, Irvington, N.J. 07111

[22] Filed: Oct. 25, 1974

[21] Appl. No.: 518,161

[52] U.S. Cl. .................. 3/1.91; 3/1.911; 3/1.912; 128/92 C; 403/56
[51] Int. Cl.² ................................................ A61F 1/24
[58] Field of Search .................... 3/1, 1.9–1.913; 128/92 C, 92 CA, 92 R; 403/53, 56

[56] References Cited
UNITED STATES PATENTS

| | | | |
|---|---|---|---|
| 2,947,308 | 8/1960 | Gorman | 128/92 CA |
| 3,698,017 | 10/1972 | Scales et al. | 128/92 C X |
| 3,740,769 | 6/1973 | Haboush | 128/92 C X |
| 3,803,641 | 4/1974 | Golyakhovsky | 3/1.91 |
| 3,815,157 | 6/1974 | Skorecki | 128/92 C X |
| 3,816,854 | 6/1974 | Schlein | 128/92 C X |
| 3,829,904 | 8/1974 | Ling et al. | 128/92 C X |
| 3,848,272 | 11/1974 | Noiles | 3/1 |

FOREIGN PATENTS OR APPLICATIONS

| | | | |
|---|---|---|---|
| 1,047,640 | 7/1953 | France | 128/92 C |
| 1,334,584 | 10/1973 | United Kingdom | 128/92 C |
| 1,902,700 | 8/1970 | Germany | 3/1 |

*Primary Examiner*—Ronald L. Frinks
*Attorney, Agent, or Firm*—Bain, Gilfillan & Rhodes

[57] ABSTRACT

This invention relates to prosthetic joints of the type used to replace dysfunctional natural joints such as the shoulder, hip, and knee. Provision of an intermediate floating bearing element to which are rotatably engaged members which are in turn secured to the appropriate bone structures results in enhanced relative motion and improved resistance to dislocation. A flange or "skirt" on the floating bearing element provides additional strength and improved function. The invention is suited to embodiments in both ball and socket and hinge type joints. Assembly and disassembly of the joint are facilitated by two-piece construction of the floating bearing element and the use of snap rings for attaching fixed bearing elements to components which may be permanently secured to the bone structure. The snap rings may be designed to support normal loads yet fracture without damage to the other components, where necessary to disassemble an implanted prosthetic joint.

17 Claims, 35 Drawing Figures

PROSTHETIC JOINT WITH FLOATING BALL

PARTIAL ABDUCTION

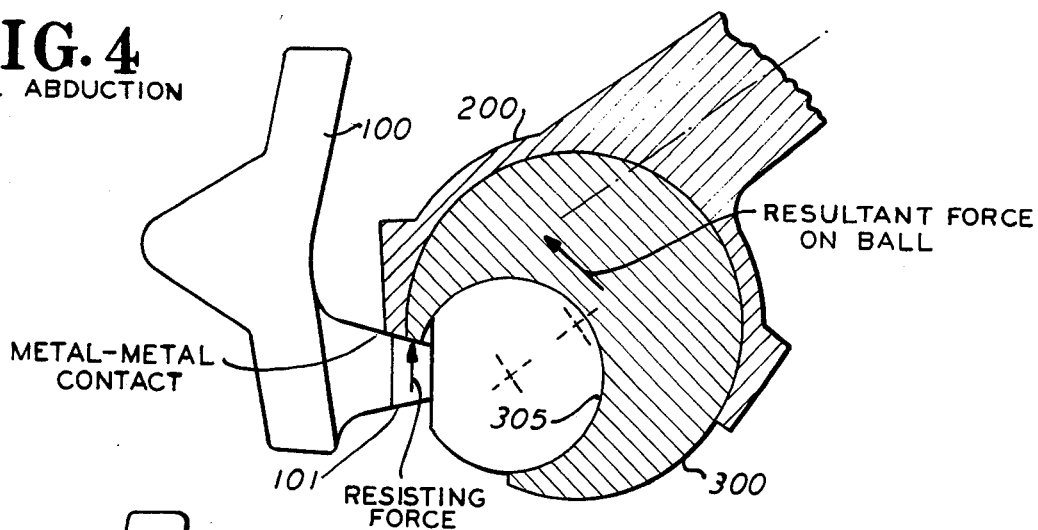
FIG. 4 FULL ABDUCTION
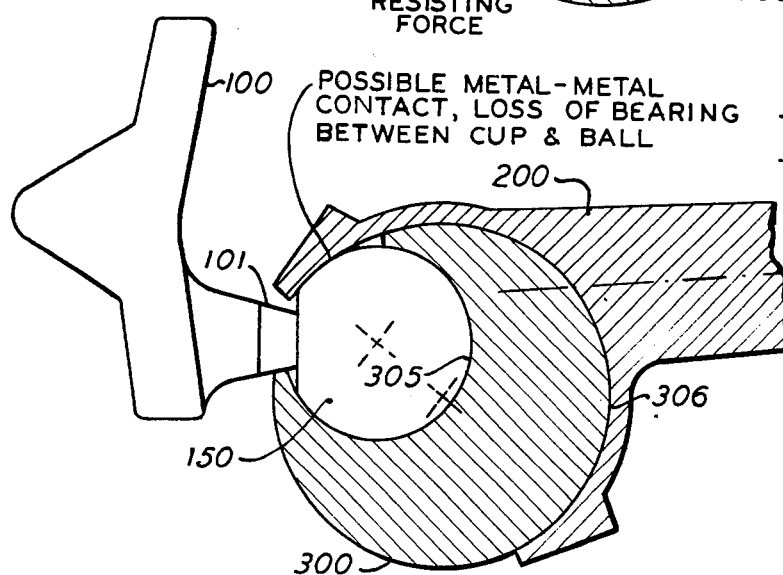
FIG. 5 RESTRICTED ABDUCTION WITHOUT SKIRT
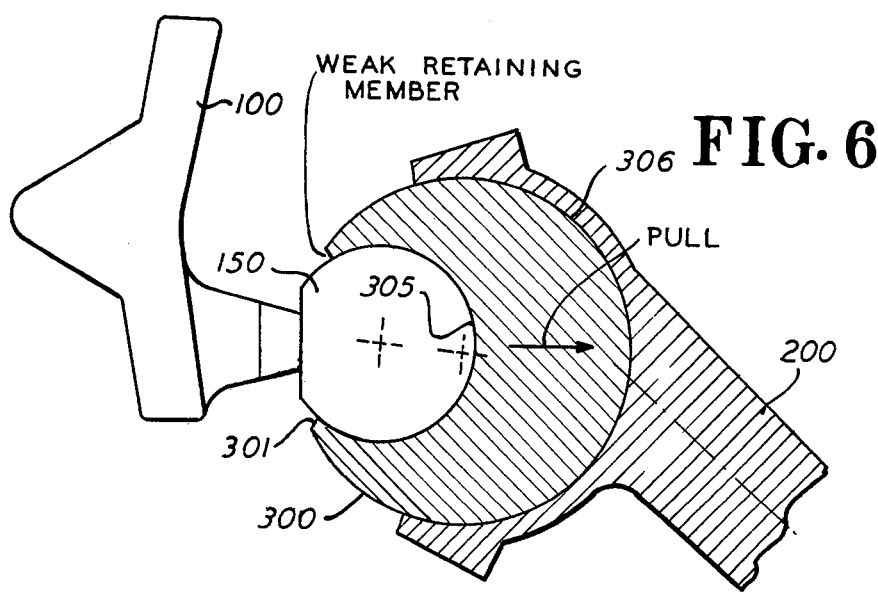
FIG. 6

PROSTHETIC JOINT WITH FLOATING BALL HAVING A SKIRT

FULL ABDUCTION

PARTIAL ABDUCTION

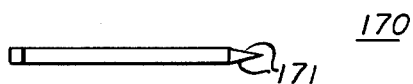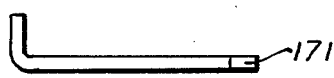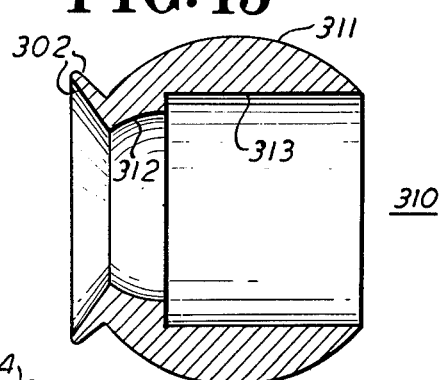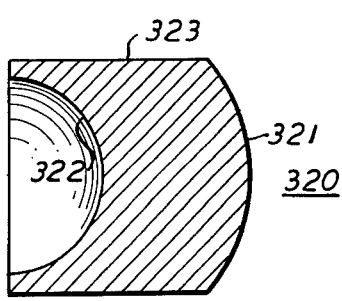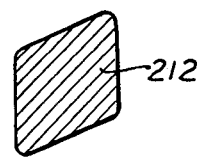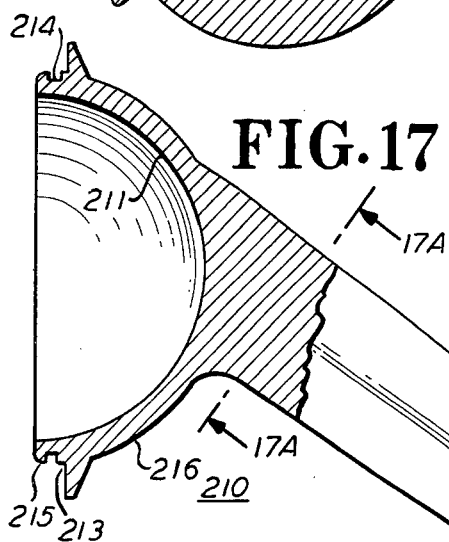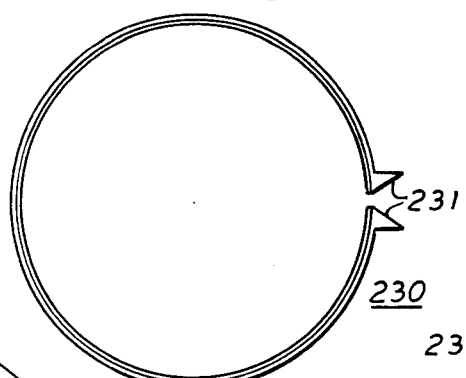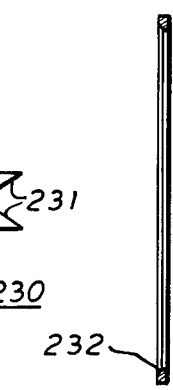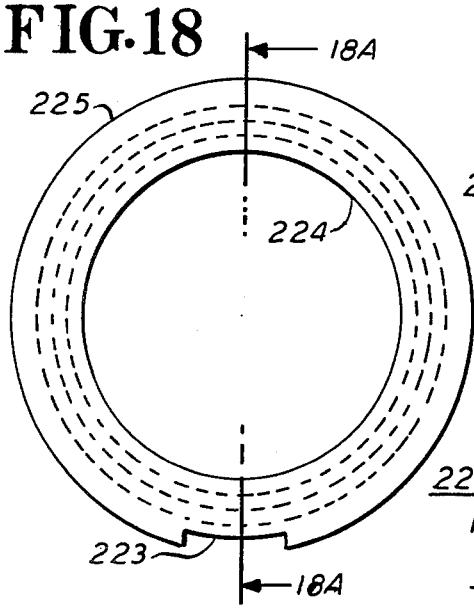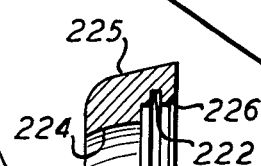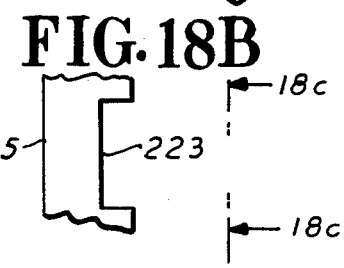

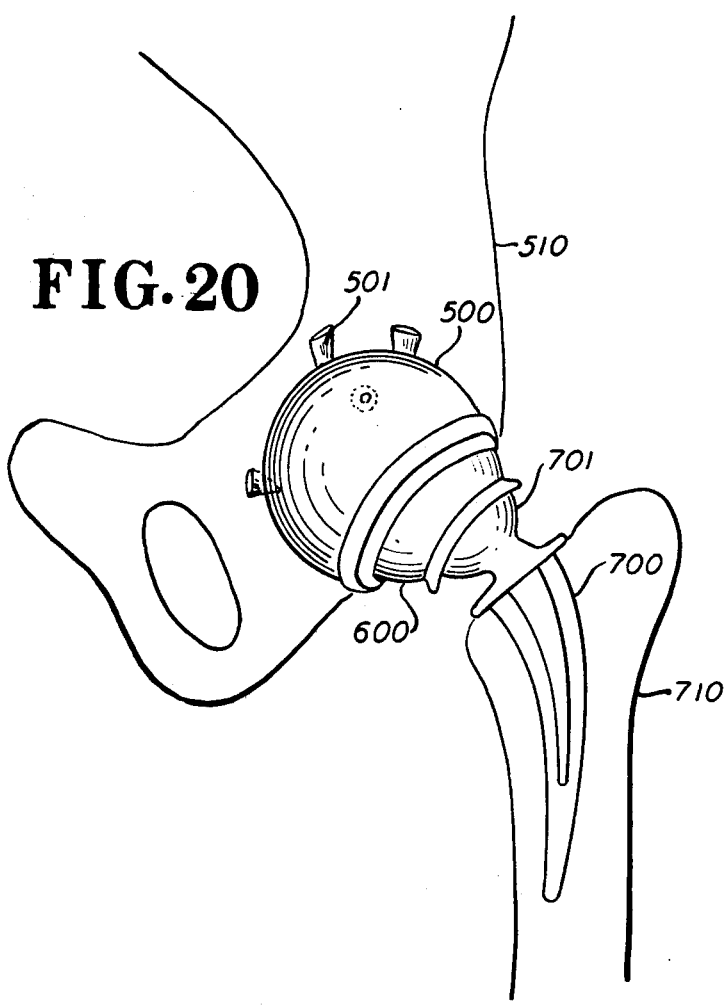
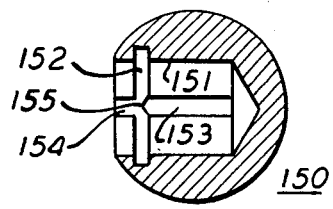
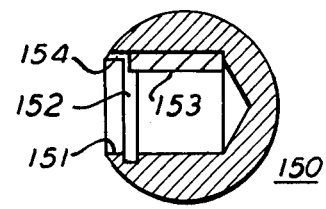
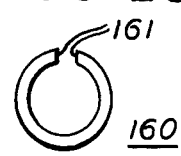
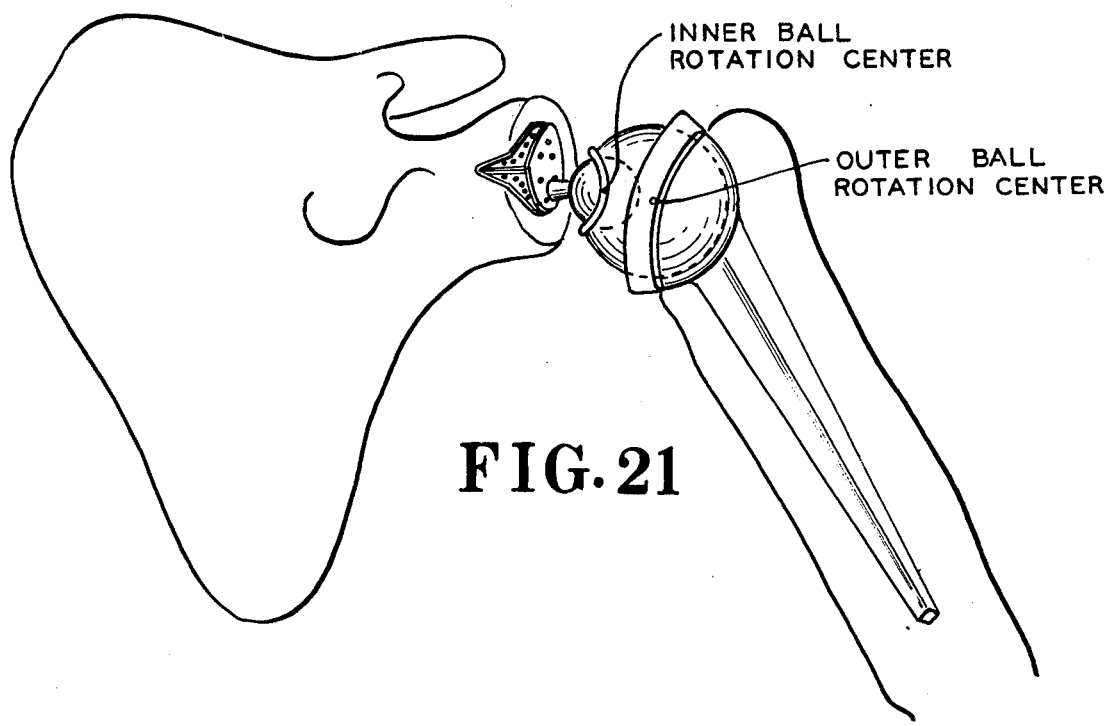

FIG. 22

"FLOATING CYLINDER" KNEE PROSTHESIS

FEMORAL COMPONENT

TIBIAL COMPONENT

LATERAL VIEW

FIG. 23

"FLOATING CYLINDER" KNEE PROSTHESIS

FEMORAL COMPONENT

TIBIAL COMPONENT

A-P VIEW

FIG. 24

"FLOATING CONE" KNEE PROSTHESIS

FEMORAL COMPONENT

TIBIAL COMPONENT

LATERAL VIEW

FIG. 25

"FLOATING CONE" KNEE PROSTHESIS

FEMORAL COMPONENT

A-P VIEW

FLOATING CENTER PROSTHETIC JOINT

BACKGROUND OF THE INVENTION

This invention relates to surgery and prosthetics generally, and in particular to prosthetic joints for replacement of damaged or dysfunctional joints such as the shoulder, hip, or knee.

The discussion that follows deals primarily with the shoulder, and a prosthetic joint for the shoulder, by way of example only. The invention has application to all types of joints, including hip joints and hinge-type joints such as the knee as well.

The total motion of the shoulder girdle results from synchronous motion of its attending four articulations. These are the sterno-clavicular. acromio-clavicular, scapulo-thoracic and gleno-humeral joints. Of these, the gleno-humeral joint provides the largest portion of the motion and thus is the most important. Unfortunately, it is also the most likely to produce dysfunction or pain as a result of arthritis or trauma. It is estimated that 6,000,000 individuals in this country suffer from serious shoulder joint problems.

In contrast to recent successful widespread use of total joint arthroplasty of the hip, the most commonly used salvage procedure for the gleno-humeral joint is fusion, with its attendant loss of function and disfigurement. Shoulder joint surface replacement prostheses, such as the Neer prosthesis, can be used where only the joint surfaces are involved and where stability of the joint is not a problem. In most shoulder problems, however, where a patient is a candidate for fusion, the entire joint is involved to the point where serious joint instability exists. Thus, for these cases, a non-dislocatable total replacement joint prosthesis is required if an implant device is to be used.

There have been numerous attempts to produce a suitable total non-dislocatable shoulder joint. Typical of these designs is the simple ball and socket prosthetic joint shown in FIG. 1, consisting of a glenoid component 100 incorporating a socket, and a humeral component 200 with a ball 150 attached. The ball 150 is movably retained in the socket of the glenoid component. Alternatively, the ball might be affixed to the glenoid component, with portions of the humeral component defining a socket in which the ball is movably retained. While the discussion that follows is directed to the former configuration, the shortcomings of the design are inherent in the alternative configuration as well; the basic design suffers from two defects.

First, since the joint must be non-dislocatable, the relative motion between the glenoid and humeral components is limited by the need for sufficient overlap between the ball and socket to produce a joint with adequate pull-out strength. This inadequate range of motion results in impingement of the prosthesis parts during normal activity. The impingement causes, in addition to the obvious restricted motion, unusual bending couples to be applied to the scapula. These forces often produce fracture of the scapula or glenoid, or displacement or dislocation of the prosthesis. Even if these problems could be avoided, the impingement greatly accelerates prosthesis wear and its attending problems.

Secondly, the normal anatomical motion of the gleno-humeral joint is not that of a simple ball and socket. Rather, the center of rotation shifts during motion so as to facilitate efficient use of the muscles and increase range of motion. Thus, the simple ball and socket or fixed center-of-rotation devices would reduce the effectiveness of the gleno-humeral joint even if a solution were available to the above-mentioned failure modes.

As a result of these problems, the non-dislocatable type replacement shoulders that have been implanted in humans to date have been at best only partially successful. Similar problems of limitation of motion and susceptibility to dislocation are present in prior-art prosthetic joints for the hip and knee.

SUMMARY OF THE INVENTION

The primary object of the present invention is to provide a new prosthetic joint with increased range of motion and resistance to dislocation. This object is accomplished by an intermediate floating bearing element having the center of its internal bearing surface offset from the center of its external bearing surface to produce a composite joint having a floating, rather than a fixed, center of rotation.

An optional flange or "skirt" on the floating bearing element provides greatly increased strength, resistance to dislocation and avoidance of motion-restricting modes with only minimum restriction of motion. Assembly and disassembly of the joint are facilitated by two-piece construction of the floating bearing element and the use of snap rings for attaching fixed bearing elements to components which may be permanently secured to the bone structure. The snap rings may be designed to support normal loads yet fracture without damage to the other components, where necessary to disassemble an implanted prosthetic joint.

BRIEF DESCRIPTION OF THE DRAWINGS

A more complete understanding of the invention may be had from the following detailed description, particularly when read in the light of the accompanying drawings wherein:

FIG. 4 shows a flangeless embodiment of the invention in full abduction.

FIG. 5 shows a flangeless embodiment of the invention in a situation of restricted abduction.

FIG. 6 shows a flangeless embodiment of the invention, and illustrates the forces tending to cause dislocation.

FIG. 7 is a schematic drawing only, and details necessary for assembly and disassembly of the joint are intentionally omitted in order to clarify the major structural features.

FIGS. 12 and 12A show, in cross section, the ball which is attached to the glenoid component.

FIG. 13 shows the retaining ring used to secure the ball to the glenoid component.

FIGS. 14 and 14A show the tool used to disassemble the ball from the glenoid component. This same tool, or one with minor alterations, may also be used to disassemble the rim component from the humeral component.

FIGS. 15 and 16 illustrate the two segments constituting the floating ball assembly.

FIGS. 17 and 17A show the floating socket component. Certain portions are in cross section.

FIGS. 18, 18A, 18B and 18C show the rim component.

FIGS. 19 and 19A show the retaining ring used to secure the rim component to the floating socket component.

FIG. 20 illustrates an implanted hip joint according to the disclosed invention.

FIG. 21 illustrates an implanted shoulder joint according to the disclosed invention.

FIGS. 22 and 23 show an implanted knee prosthesis utilizing a floating cylinder design according to the disclosed invention.

FIGS. 24 and 25 show an implanted knee prosthesis using a floating cone design according to the disclosed invention.

DESCRIPTION OF THE INVENTION

The description that follows is directed to an improved prosthetic shoulder joint by way of illustration only. The invention is applicable to other types of joints, including hip joints and hinge-type joints such as the knee as well.

Figure 1:
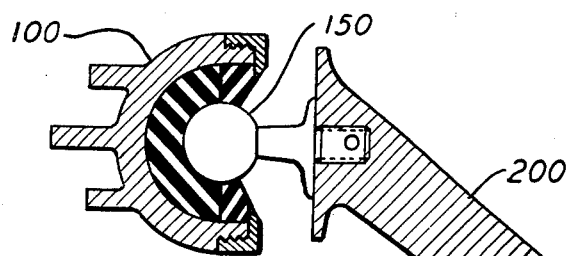
FIG. 1 is an illustration of a prior art prosthetic joint.
Figure 2:
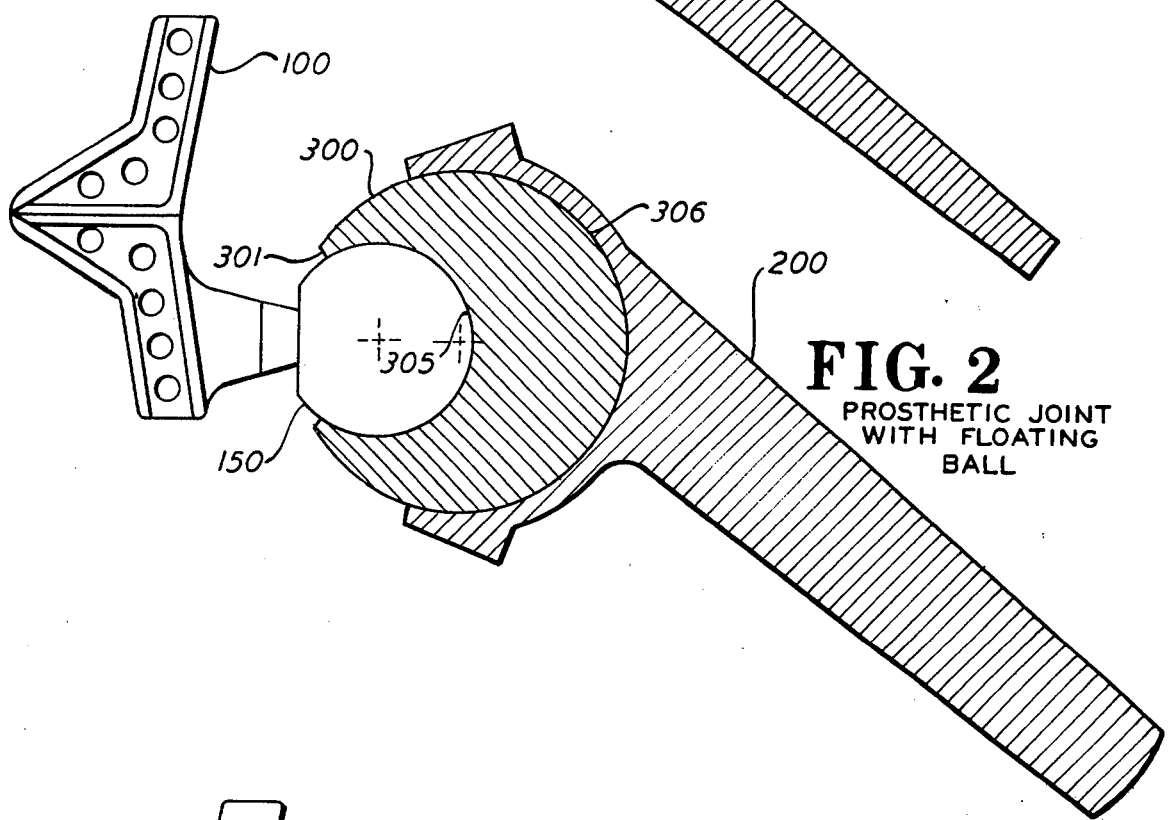
FIG. 2 is a schematic illustration of the present invention. Certain details have been omitted to make the operation of the joint more readily apparent.

FIG. 2 shows in schematic form a very basic embodiment of the invention as adapted to a prosthetic joint for the shoulder.

Certain details, having to do with how the joint is actually assembled, have been intentionally omitted from FIG. 2 in the interests of clarifying the kinematic design. These details are supplied in subsequent figures.

Shown in FIG. 2 are a glenoid component 100; a ball 150; a humeral component 200 and a floating ball 300. The humeral component 200 and the floating ball 300 are depicted in cross-section. The floating ball 300 incorporates portions defining a concave bearing surface 305 which mates with and movably retains the ball 150; the floating ball 300 has a convex bearing surface 306 which mates with and is movably retained by a substantially spherical concave bearing surface of the humeral component 200. The center of the concave bearing surface 305 of the floating ball is offset from the center of the convex bearing surface 306 of the floating ball to provide a composite joint having a floating, rather than a fixed, center of rotation. A lip 301 serves to truncate the convex and concave bearing surfaces of the floating ball 300.

While the embodiment of the invention depicted in FIG. 2 provides important advantages, namely increased range of motion with improved resistance to dislocation, over prior prosthetic joints, there are certain undesirable aspects which are depicted in FIGS. 3, 4, 5 and 6.

Figure 3:
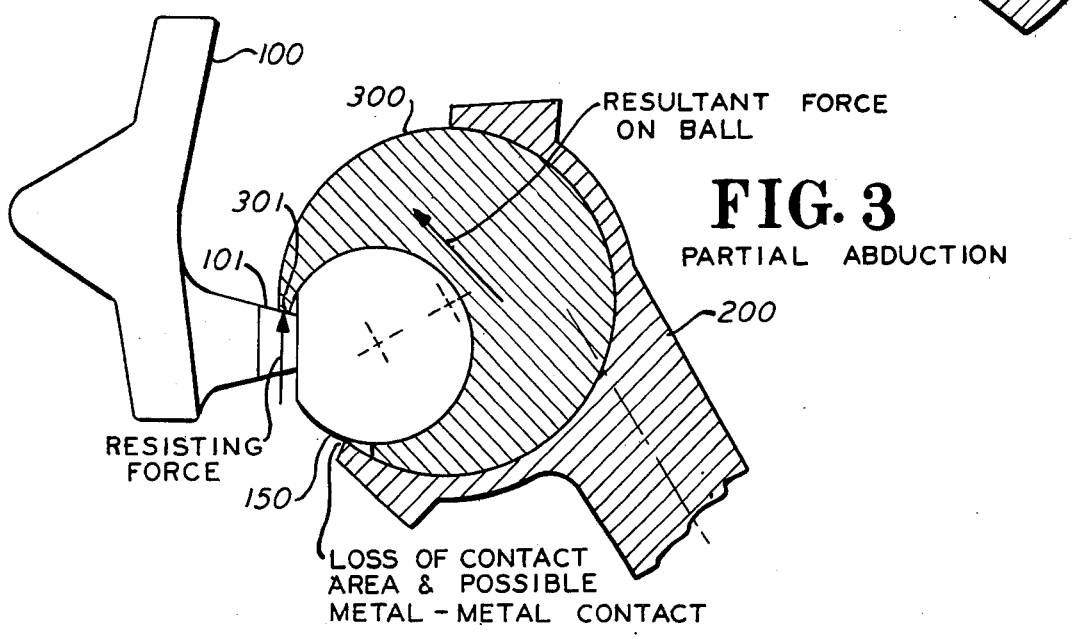
FIG. 3 shows a flangeless embodiment of the invention in partial abduction.

FIG. 3 shows a condition of partial abduction of the arm where the floating ball has rotated until its lip 301 has contacted the stem 101 of the glenoid component 100. This situation results in a loss of contact area between the convex bearing surface of the floating ball 300 and the concave bearing surface of the humeral component 200, with the additional possibility of undesirable metal-to-metal contact between the humeral component 200 and the ball 150.

FIG. 4 shows the situation corresponding to full abduction of the arm where the floating ball 300 has rotated with the humeral component 200. Here there is undesirable metal-to-metal contact between the humeral component 200 and the stem 101 of the glenoid component.

FIG. 5 shows a condition of restricted abduction of the arm where the floating ball 300 has rotated opposite to the rotation of the humeral component 200, causing loss of contact area between the ball 150 and the concave bearing surface of the floating ball 300 and the possibility of undesirable metal-to-metal contact between the humeral component 200 and the stem 101 and possibly with the ball 150 as well.

The basic embodiment of FIG. 2 is also somewhat susceptible to dislocation, as shown in FIG. 6. The floating ball 300 may be of some relatively weak plastic material. The lip 301 of the floating ball, which serves to retain the ball within the floating ball, is inherently of small cross-section. The combination of weak material and small cross-section makes the resultant joint susceptible to tensile or "pull-out" forces on the joint which tend to deform the lip 301 of the floating ball 300.

Figure 7:
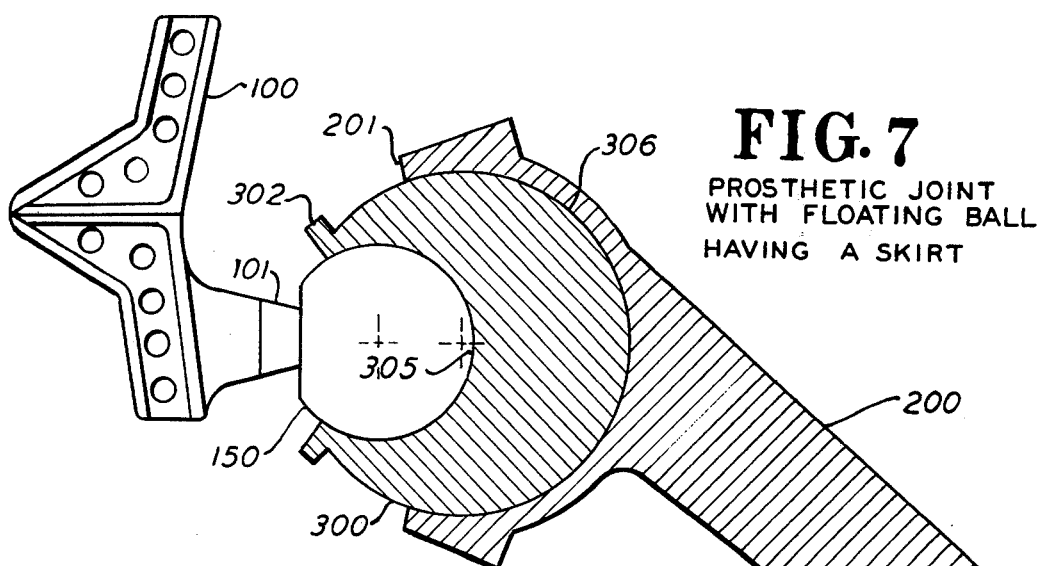
FIG. 7 illustrates an embodiment of the invention in which the floating bearing means incorporates a flange.

FIG. 7 depicts a preferred embodiment of the invention, as adapted to a ball-and-socket type joint for a shoulder prosthesis The floating ball 300 incorporates a flange, or "skirt," 302 which provides the following advantages:

1. The flange 302 on the floating ball 300 provides a larger bearing surface contact between the floating ball 300 and the stem 101 of the glenoid component 100. Contact pressures on these surfaces can be relatively large during normal activities. The use of a flange, therefore, provides superior load characteristics at this critical contact. This feature is particularly important in weight-bearing joints such as the hip, where joint forces can exceed 1,000 lbs.

2. The flange 302 reduces the frequency of contact between the stem 101 of the glenoid component 100 and the floating ball 300. Under the action of the force system associated with the joint, the floating ball 300 will rotate, even without significant rotation of the humeral component 200, until it contacts a stop. Without a flange, this stop is the stem 101 of the glenoid component 100. Thus, the relatively small contact surface between the floating ball 300 and the stem 101 of the glenoid component 100 must support the applied loads. Where a flange is used, the stop can be either the stem 101 of the glenoid component 100 or the rim 201 of the humeral component 200. This resultant contact surface produced by contact between the flange and the rim is larger than that produced by the lip of a floating ball which does not incorporate a flange, and the resultant joint is therefore more damage-resistant. Thus, where a flange is used wear is distributed between two contact areas rather than confined to a single area. This feature is of particular importance in weight-bearing joints.

3. The flange 302 acts as a driving element to guarantee that the full range of motion that is available can be utilized and that there is always complete contact between the floating ball 300 and the concave bearing surface of the humeral component 200, thus avoiding the motion restriction mode shown in FIG. 5.

4. The flange 302 eliminates the possibility of undesirable metal-to-metal contact as shown in FIGS. 3, 4 and 5.

5. The flange 302 acts as a reinforcing ring, thereby increasing the strength of the joint to forces tending to dislocate the ball 150 from the concave bearing surface of the floating ball 300.

Figure 8:
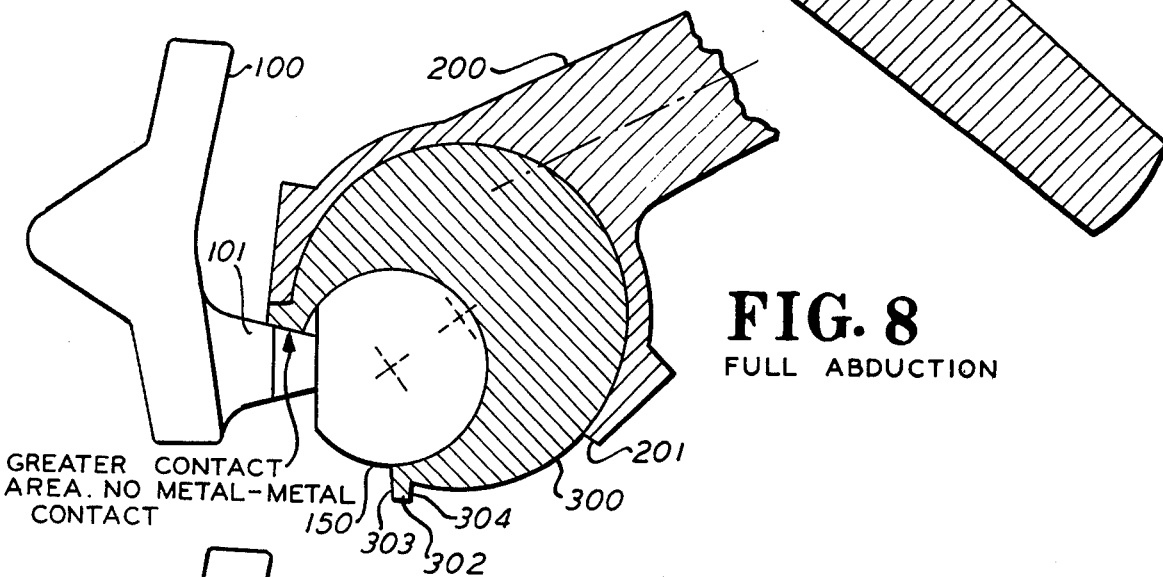
FIG. 8 shows a flanged version of the joint in full abduction.
Figure 9:
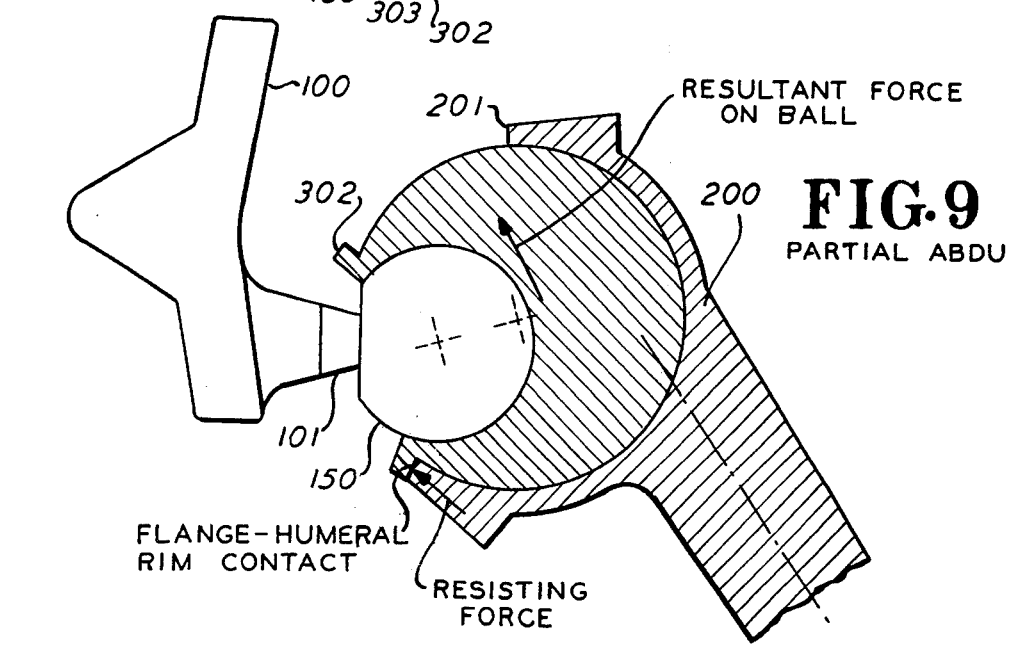
FIG. 9 shows a flanged version of the invention in partial abduction.
Figure 10:
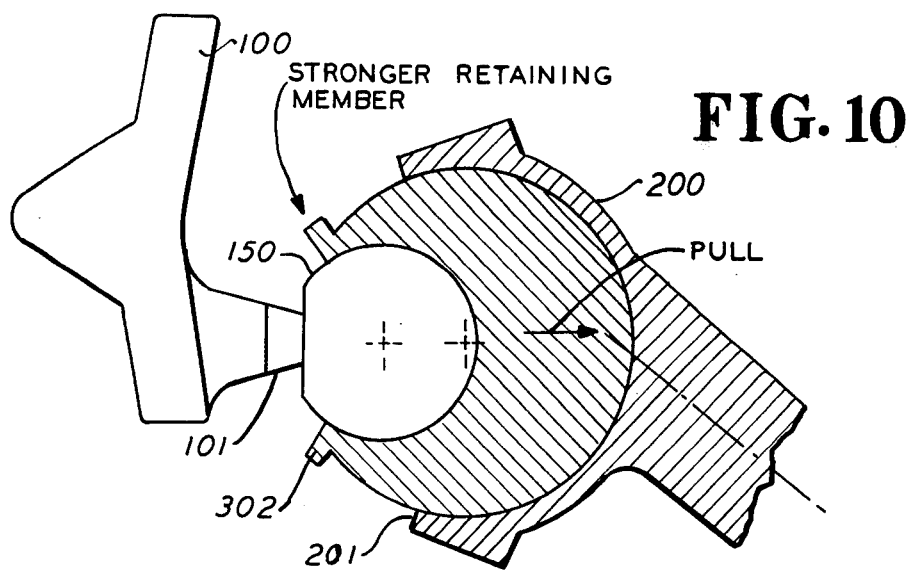
FIG. 10 shows a flanged version of the invention, illustrating the improved resistance to dislocation.
Figure 11A:
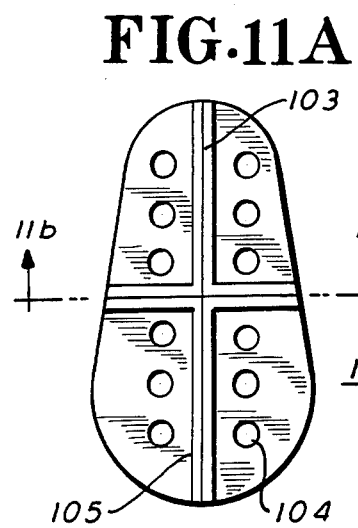
FIGS. 11, 11A, 11B and 11C show details of the glenoid component.
Figure 11:
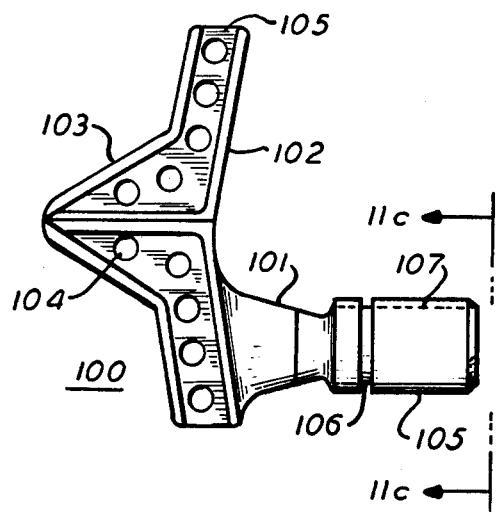
Figure 11B:
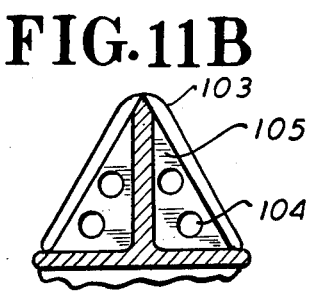
Figure 11C:
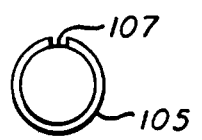

Function of the prosthetic joint in which a flange has been added to the floating ball is illustrated by FIGS. 8–10.

FIG. 8 shows the condition of full abduction of the joint. It will be seen that the flange 302 of the floating ball 300 is interposed as a load-distributing member between the stem 101 of the glenoid component and the rim 201 of the humeral component, providing greater contact area and precluding the possibility of direct contact of the glenoid and humeral components. The floating ball may be a non-metal, whereas the glenoid and humeral components are customarily metallic. Therefore, the flange of the floating ball prevents undesirable metal-to-metal contact.

It will be noted that the flange 302 incorporates inner and outer flange surfaces 303 and 304 respectively for engaging the stem 101 of the glenoid component and the rim 201 of the humeral component respectively.

FIG. 9 shows a condition of partial abduction of the joint and illustrates the function of the flange as a load-bearing member in this situation. The forces on the joint cause the floating ball to rotate until the flange engages the rim of the humeral component, at which point rotation is terminated and the flange-rim system supports a portion of the loads applied to the joint. This engagement eliminates the motion restriction mode shown in FIG. 5.

FIG. 10 illustrates the utility of the flange 302 in resisting forces tending to dislocate the joint by pulling the ball from its socket in the floating ball. It will be seen that the flange serves as a strengthening rib to make the opening in the floating ball more resistant to deformation.

Details of one possible embodiment of the glenoid component 100 are shown in FIGS. 11, 11A, 11B and 11C.

The glenoid component 100, made from some biologically compatible material such as Vitallium, stainless steel, or titanium, consists of a plate 102 shaped similarly to the glenoid surface. Attached to plate 102 are sharpened fins 103 and a stem 101. The fins and plate both have a series of cementing holes 104 used for prosthesis attachment. The cylindrical stem end 105 contains an annular groove 106 and a keyway 107.

A ball 150, shown in cross-section in FIGS. 12 and 12A, made of the same material as the glenoid component 100, or another material such as a biocompatible ceramic, contains a hole 151 of a size so as to produce a light push fit with the stem end 105, an annular groove 152 matching the annular groove 106, a key 153 matching the keyway 107, and an access slot 154. The ring 160, shown in FIG. 13, is retained in the groove 152. The configuration of these parts is such that if the stem end 105 is pushed into the hole 151, the ring 160 will be deflected in its groove 152 until it is aligned with groove 106, at which point it will snap into groove 106 to lock the ball 150 in place on the stem end 105. The mating of key 153 with keyway 107 prevents rotation of the ball 150 on the stem end 105. Elimination of relative motion between metal parts is important since such motion can produce metallic wear products or fretting corrosion, both of which produce adverse physiological reaction.

The ball can be withdrawn by the use of a tool 170, shown in FIGS. 14 and 14A, with a tapered end 171. This tool is inserted in slot 154 until it abuts the ends 161 of the ring 160, which is retained in a fixed relation to the slot 152 by the end 155 of the key 153. Pushing the tool 170 will cause the tapered end 171 to separate the ring ends 161, withdrawing the ring 160 from groove 106 and into groove 152. When the ring 160 is fully withdrawn, the ball 150 can be removed.

FIGS. 15 and 16 show, in cross section, one possible embodiment of the floating ball 300. The first floating ball segment, shown in FIG. 15, has a convex spherical surface 311, a concave spherical surface 312, an interior cylindrical surface 313 and a flange 302. It is constructed of biocompatible plastic such as ultra-high molecular weight polyethylene or ceramic material such as aluminum oxide providing good bearing and wear properties.

The second floating ball segment shown in FIG. 16, has a convex spherical surface 321, a concave spherical surface 322, and an exterior cylindrical surface 323 complementary to the interior cylindrical surface 313 of the first floating ball segment 310. It is made of the same or similar material as the first floating ball segment 310, and it is proportioned so that the corresponding spherical and cylindrical surfaces are matched with those of the first floating ball segment 310 to produce a composite floating ball with a concave spherical bearing surface, a convex spherical bearing surface, and wherein the center of the concave spherical bearing surface is offset from the center of the convex bearing surface.

The humeral assembly 200 consists of a floating socket component 210 with attached fixation spike 212 shown in FIGS. 17 and 17A in partial cross-section, a rim component 220, shown in FIGS. 18, 18A, 18B and 18C, and a retaining ring 230, shown in FIGS. 19 and 19A.

The floating socket component 210 is made of a biocompatible metal or ceramic, and has a concave spherical cup 211, a fixation spike 212 and a cylindrical surface 213 having an annular groove 214, a beveled edge 215, and a generally spherical external cup surface 216.

The rim component 220 is made of the same material as the floating socket component 210 and consists of a short cylindrical segment 221 proportioned so as to produce a medium push fit with the surface 213 of the base component 210, an annular groove 222, an access slot 223. The rim component 220 also includes a concave spherical bearing surface 224 and a generally conical exterior surface 225.

A snap ring 230 having tabs 231 and a beveled edge 232, shown in FIGS. 19 and 19A, is carried within the groove 222 of the rim component 220 in such a way that the tabs 231 fit into the access slot 223 of the rim component 220. The snap ring 230 serves to retain the rim component 220 to the floating socket component 210 by engaging the annular grooves 214 and 222 provided for that purpose.

It should be noted that an alternative design, in which the floating socket component incorporates an interior cylindrical surface for mounting a rim component by means of a complementary exterior cylindrical surface, is also practical. Such a design may be suited to certain prosthetic joints as, for example, hip joints.

The floating socket component 210, the rim component 220, and the snap ring 230 together form a humeral component 200 which can be disassembled and reassembled to movably retain the floating ball assembly 300. The design of the floating ball 300 is such that with the joint assembled, integrity of the two-piece floating ball 300 is insured by virtue of its retention within the humeral assembly 200.

When the rim component is pushed onto the floating socket component, the beveled edge 215 of the floating socket component 210 engages the beveled edge 232 of the snap ring 230, causing snap ring 230 to retract into annular groove 222 of the rim component 220 where it is normally retained. When the rim component 220 has assumed its proper position on the floating socket component 210, snap ring 230 drops into annular groove 214 of the floating socket component 210, thereby forming a single humeral assembly 200 having a spherical bearing surface formed by spherical bearing surfaces 224 of the rim component and spherical bearing surface 211 of the floating socket component. The concave spherical bearing surface so formed matches the convex spherical bearing surface of the floating ball 300, comprising floating ball segments 310 and 320. A tool 170 with beveled edge 171, shown in FIGS. 14 and 14A may be used to spread the ends of the snap ring 230 and thus withdraw the snap ring 230 into its groove 222 in the rim component 220, thereby permitting disassembly of the humeral component 200 and removal of the floating ball element 300.

Both retaining rings 160 and 230 may be constructed of a biocompatible plastic such as acrylic or ultra-high molecular weight polyethylene. Since such plastics are far weaker than the metal or ceramic used in the parts which the rings joint, each ring may be designed to have adequate strength to support the loads normally imposed while allowing fracture of the ring without damage to the structural components of the joint. Thus, in the event of a failure of the ring retraction mechanisms due to tissue ingrowth or other phenomena, the prosthesis may be disassembled by fracture of the rings without damage to the glenoid and humeral components. This feature is important since these components may be cemented in place and removal would produce additional trauma.

FIG. 21 illustrates the completed joint implanted as a shoulder prosthesis. FIGS. 22 and 23 illustrate an implanted prosthetic knee joint embodying a floating cylinder design, while FIGS. 24 and 25 illustrate an implanted prosthetic knee joint embodying a floating cone design.

FIG. 20 shows an embodiment of the invention adapted to a prosthetic joint for the hip. A pelvic component 500 has a concave spherical bearing surface which receives and movably retains a floating bearing element 600, which has a convex spherical bearing surface complementary to the concave bearing surface of the pelvic component 500. The pelvic component 500 is secured, for example, by pins 501 and cement to the pelvis 510.

The floating bearing element 600 incorporates a concave spherical bearing surface having its center offset from the center of the convex spherical bearing surface of the floating bearing element 600.

A femoral component 700, secured to the femur, incorporates a ball 701 which is received and movably retained by the concave spherical bearing surface of the floating bearing element 600.

Implantation of a shoulder prosthesis, for example, can be accomplished in the following way. The glenoid is prepared by removing the articular surface and cutting undercut slots in the surface so as to receive the fins 105 of the glenoid component 100. Bone cement is then placed on the fins in the holes 104, and in the slots in the glenoid. The glenoid component is then impacted and the cement allowed to harden. The cement interlock between the holes in the component and the undercut slots in the bone holds the component firmly in place.

The humerus is prepared by osteomizing the anatomical neck and reaming the shaft to receive the fixation spike 212 and the cup 216. The floating socket component 210 is then put in place. An assembly consisting of the ball 150 with its retaining ring 160 and the floating ball segments 310 and 320 is then installed by snapping the ball 150 on the glenoid component 100 and then retaining this assembly by use of the rim component 220. It may be seen that the rim component 220 acts in a way to retain the floating ball segments 310 and 320 so that they act as a single unit.

The arm is then manipulated to insure proper function. If proper function exists, the ball-floating ball assembly is removed, using the appropriate tools, the rod 212 and cup 216 of the humeral component 210 are cemented in place and the ball assembly reinstalled In the event of difficulty, the ball assembly may be removed and the position of the humeral or, if required, the glenoid component adjusted until proper function is obtained. The parts may be then reassembled after the humeral component is cemented in its proper location.

When installed this floating ball prosthesis provides significantly greater motion than a simple ball socket prosthesis since the motion associated with the floating center is added to the normal ball-socket motion. This motion may be further increased substantially by the removal of the flange 302 on the floating ball 300. However, studies of passive motion of a human cadaver with the device described herein implanted show that full anatomical motion can be obtained with a prosthetic device incorporating the skirt. Thus, since the additional motion seems unnecessary and the flange 302 provides improved pull-out resistance and eliminates the possibility of undesirable metal-to-metal contact, it is probably best to use a design incorporating a flange.

For example, a typical simple metal ball-plastic pocket joint with adequate pull-out strength would provide about 85° gleno-humeral adduction-abduction. The design illustrated here provides 135° motion with the skirt and 150° without the skirt. Normal motion is usually less than 100°. Thus, it may be seen that the floating ball design provides more than sufficient motion while the conventional design provides less than adequate motion.

It will be understood by those skilled in the art that with regard to FIG. 2 and with regard to the glenoid-humeral joint that the improved prosthetic joint of the present invention may be referred to as a floating socket wherein ball 300 is analogous to the anatomical rotator cuff and ball 150 is analagous to the glenoid articulation.

In reference to the hip joint, again the ball 600 would be referred to as a floating socket receiving the femoral articulatic ball 701. The socket 600 would provide the increased motion unavailable by present prosthetic acetabular sockets. In reference to the knee joint, the random pivot center provided by the floating center prosthetic would allow a range of motion when floating cylindrical or conical assemblies are used. The instant center pathway comparable to the anatomic instant center pathway of the knee joint can be appreciated with this floating center arrangement.

Significant advantages of the floating center prosthetic joint include:

1. Much greater range of motion allowing normal anatomical movement without serious prosthesis impingement and restriction. This motion is not provided by the conventional simple ball-socket or fixed rotation center devices.

2. A floating ball simulates the normal anatomical floating rotational center of the shoulder, for example, allowing greater anatomical motion and muscle efficiency.

3. The construction of the floating ball is such that the rim component which retains the ball in the humeral component also holds the ball segments so that they act as a single unit. This feature eliminates the need for separate retaining elements or surfaces.

4. The ability to easily connect and disconnect the ball-floating ball assembly during the implantation operation greatly increases the ease and flexibility of the operative procedure thereby reducing potential injury to the patient and decreasing the morbidity.

5. The ability to easily disconnect the ball-floating ball assembly makes feasible the relatively simple replacement of this part in the event wear of the plastic ball is excessive. The use of ceramic elements would of course eliminate this potential problem.

Provision of a flanged floating bearing means provides additional advantages including:

1. The flange provides a larger bearing surface contact. Contact pressures on these surfaces can be relatively large during normal activities. The use of a flange, therefore, provides superior load characteristics at this critical contact. This feature is particularly important in weight-bearing joints such as the hip, where joint forces can exceed 1,000 lbs.

2. The flange provides for impingement on two stopping contact surfaces rather than a single stopping contact surface thereby distributing damage and wear.

3. The flange acts as a driving element to guarantee that the full range of motion that is available can be utilized.

4. The flange eliminates the possibility of undesirable metal-to-metal contact.

5. The flange acts as a reinforcing member, thereby increasing the strength of the joint to forces tending to dislocate.

What is claimed is:

1. An improved prosthetic joint comprising:
   a. floating bearing means having portions defining a first floating bearing surface which has a cross section conforming to a first circular arc;
   b. the floating bearing means having portions defining a second floating bearing surface which has a cross section conforming to a second circular arc;
   c. a first member having portions defining a first anchor means for being secured to a first bone;
   d. the first member having portions defining a first bearing means for rotatably engaging the first bearing surface of the floating bearing means, thereby permitting relative motion of the first member and the floating bearing means about a first center of rotation;
   e. a second member having portions defining a second anchor means for being secured to a second bone;
   f. the second member having portions defining a second bearing means for rotatably engaging the second bearing surface of the floating bearing means, thereby permitting relative motion of the second member and the floating bearing means about a second center of rotation;
   g. wherein the first center of rotation is offset from the second center of rotation.

2. An improved prosthetic joint as recited in claim 1, in which the first center of rotation is offset in the direction of the first member from the second center of rotation.

3. An improved prosthetic joint as recited in claim 1, in which the floating bearing means comprises:
   a. flange means for limiting relative motion between the first member and the floating bearing means and for limiting relative motion between the second member and the floating bearing means; and
   b. the flange means for providing increased strength to the improved prosthetic joint.

4. An improved prosthetic joint comprising:
   a. floating bearing means having portions defining a floating convex bearing surface which conforms to a portion of a first sphere;
   b. the floating bearing means having portions defining a floating concave bearing surface which conforms to a portion of a second sphere;
   c. a first member having portions defining a first anchor means for being secured to a first bone;
   d. the first member having portions defining a concave bearing surface complementary to the floating convex bearing surface, the concave bearing surface rotatably engaging the floating convex bearing surface, thereby permitting relative motion of the first member and the floating bearing means about a first center of rotation;
   e. a second member having portions defining a second anchor means for being secured to a second bone;
   f. the second member having portions defining a convex bearing surface complementary to the floating concave bearing surface, the convex bearing surface rotatably engaging the floating concave bearing surface, thereby permitting relative motion of the second member and the floating bearing means about a second center of rotation;
   g. wherein the first center of rotation is offset from the second center of rotation.

5. An improved prosthetic joint as recited in claim 4, in which the first center of rotation is offset in the direction of the first member from the second center of rotation.

6. An improved prosthetic joint as recited in claim 5, in which the floating bearing means comprises:

a. first flange means for engaging the first member to limit rotation of the floating bearing means relative to the first member; and b. second flange means for engaging the second member to limit rotation of the floating bearing means relative to the second member.

7. An improved prosthetic joint as recited in claim 6, in which the floating bearing means comprises:

a. a first floating ball segment including portions constituting a part of the floating convex bearing surface, portions constituting a part of the floating concave bearing surface, and portions defining an interior cylindrical surface having a diameter greater than the diameter of the second sphere;

b. a second floating ball segment including portions constituting a part of the floating convex bearing surface, portions constituting a part of the floating concave bearing surface, and portions defining an exterior cylindrical surface complementary to the interior cylindrical surface of the first floating ball segment, whereby the floating bearing means can be disassembled to remove, and reassembled to receive and retain, the convex bearing surface of the second member.

8. An improved prosthetic joint as recited in claim 7, wherein the first member comprises:

a. a first fixture component, including the first anchor means for being secured to the first bone;

b. the first fixture component having portions constituting a part of the concave bearing surface of the first member;

c. the first fixture component having portions defining a first cylindrical surface with a first annular groove;

d. a retention component having portions constituting a part of the concave bearing surface of the first member;

e. the retention component having portions defining a second cylindrical surface complementary to the first cylindrical surface of the first fixture component, and a second annular groove;

f. first retaining ring means engaging the first annular groove of the fixture component and the second annular groove of the retention component for demountably securing the rim component to the first fixture component, thereby permitting the first member to be disassembled to receive, and reassembled to retain, the floating bearing means.

9. An improved prosthetic joint as recited in claim 8, in which the first retaining ring means are frangible retaining ring means for diassembly of the retention component from the fixture component to permit removal of the floating bearing means.

10. An improved prosthetic joint as recited in claim 9, in which the second member comprises:

a. a second fixture component, including the second anchor means for being secured to the second bone;

b. a stem rigidly attached to the second fixture component and having portions defining a second exterior cylindrical surface, a third annular groove, and a first keyway;

c. a ball having portions constituting the convex bearing surface of the second member;

d. the ball including portions defining a second interior cylindrical surface complementary to the second exterior cylindrical surface of the stem, a fourth annular groove, and a second keyway;

e. second retaining ring means engaging the third annular groove of the stem and the fourth annular groove of the ball for demountably securing the ball to the stem; and f. keying means for engaging the first keyway of the stem and the second keyway of the ball to prevent rotation of the ball on the stem.

11. An improved prosthetic joint as recited in claim 10, in which the second retaining ring means are frangible retaining ring means for disassembly of the ball from the stem.

12. An improved prosthetic joint comprising:

a. floating bearing means having portions defining a floating convex bearing surface which conforms to a portion of a first right circular cylinder;

b. the floating bearing means having portions defining a floating concave bearing surface which conforms to a portion of a second right circular cylinder;

c. a first member having portions defining a first anchor means for being secured to a first bone;

d. the first member having portions defining a concave bearing surface complementary to the floating convex bearing surface, the concave bearing surface rotatably engaging the floating convex bearing surface, thereby permitting relative motion of the first member and the floating bearing means about a first axis of rotation;

e. a second member having portions defining a second anchor means for being secured to a second bone;

f. the second member having portions defining a convex bearing surface complementary to the floating concave bearing surface, the convex bearing surface rotatably engaging the floating concave bearing surface, thereby permitting relative motion of the second member and the floating bearing means about a second axis of rotation;

g. wherein the first axis of rotation is offset from the second axis of rotation.

13. An improved prosthetic joint as recited in claim 12, in which the first axis of rotation is offset in the direction of the first member from the second axis of rotation.

14. An improved prosthetic joint as recited in claim 13, in which the floating bearing means comprises:

a. first flange means for engaging the first member to limit rotation of the floating bearing means relative to the first member; and b. second flange means for engaging the second member to limit rotation of the floating bearing means relative to the second member.

15. An improved prosthetic joint comprising:

a. floating bearing means having portions defining a floating convex bearing surface which conforms to a portion of a first right circular cone;

b. the floating bearing means having portions defining a floating concave bearing surface which conforms to a portion of a second right circular cone;

c. a first member having portions defining a first anchor means for being secured to a first bone;

d. the first member having portions defining a concave bearing surface complementary to the floating convex bearing surface, the concave bearing surface rotatably engaging the floating convex bearing surface, thereby permitting relative motion of the first member and the floating bearing means about a first axis of rotation;

e. a second member having portions defining a second anchor means for being secured to a second bone;

f. the second member having portions defining a convex bearing surface complementary to the floating concave bearing surface, the convex bearing surface rotatably engaging the floating concave bearing surface, thereby permitting relative motion of the second member and the floating bearing means about a second axis of rotation;

g. wherein the first axis of rotation is offset from the second axis of rotation.

16. An improved prosthetic joint as recited in claim 15, in which the first axis of rotation is offset in the direction of the first member from the second axis of rotation.

17. An improved prosthetic joint as recited in claim 16, in which the floating bearing means comprises:

a. first flange means for engaging the first member to limit rotation of the floating bearing means relative to the first member; and b. second flange means for engaging the second member to limit rotation of the floating bearing means relative to the second member.

* * * * *